United States Patent [19]

Shaler et al.

[11] 4,061,807

[45] Dec. 6, 1977

[54] ADSORBENT BODY AND METHOD FOR MAKING SAME

[76] Inventors: Amos J. Shaler, 705 W. Park Ave., State College, Pa. 16801; Daniel C. McLean, 4029 Alicante, Fort Worth, Tex. 76133

[21] Appl. No.: 656,551

[22] Filed: Feb. 9, 1976

[51] Int. Cl.² .......................... B01D 27/04; B01J 1/06
[52] U.S. Cl. ..................................... 428/36; 210/502; 210/510; 428/71; 428/306; 428/315; 428/402
[58] Field of Search ......................... 428/35, 36, 68, 71, 428/218, 304, 305, 306, 315, 323, 327, 331, 402; 210/502, 510, 484, 496, 506; 131/267

[56] References Cited

U.S. PATENT DOCUMENTS

| | | | |
|---|---|---|---|
| 3,318,317 | 5/1967 | Sproull et al. | 131/267 |
| 3,353,543 | 11/1967 | Sproull et al. | 131/267 |
| 3,538,020 | 11/1970 | Heskett et al. | 210/510 |
| 3,594,335 | 7/1971 | Schultz et al. | 428/306 |

*Primary Examiner*—William J. Van Balen
*Attorney, Agent, or Firm*—Reising, Ethington, Barnard, Perry & Brooks

[57] ABSTRACT

In accordance with the invention there is provided a porous adsorbent body comprising an array of granules of adsorbent material and particles of thermoplastic organic polymer bonded to the granules with at least some of the particles bridging contiguous granules thereby bonding them together to form a self-sustaining body having interstices which open into each other for admission of fluid to the surface of the granules in the interior of the body. Further in accordance with the invention such adsorbent body is made by forming a uniform mixture of the granules of adsorbent material and the particles of thermoplastic organic polymer and then heating the mixture to a temperature above the softening temperature but below the melting temperature of the thermoplastic polymer thereby to bond the granules together.

7 Claims, 4 Drawing Figures

ADSORBENT BODY AND METHOD FOR MAKING SAME

FIELD OF THE INVENTION

This invention relates to adsorbent bodies and to methods for manufacturing same.

BACKGROUND OF THE INVENTION

Adsorbents are commonly used to remove impurities or other constituents from liquids and gases. For example, activated charcoal finds wide usage in water purification and also in air and other gas purification, the function of the activated charcoal being that of an adsorbent for the impurities or other constituents desired to be separated of the fluid. As another example, granular activated silica gel is widely used as a desiccant, i.e. as a water moisture-adsorbent, as is also granular activated alumina.

For most applications of such adsorbents, it is desirable for economic reasons to thermally or otherwise treat the adsorbent, after it has become saturated, in order to remove from it the adsorbent materials, thereby to regenerate the adsorbent so that it can be re-used. Also, it is conventional to use the adsorbent in loose granuler form so as to provide maximum surface area. The loose granular adsorbent material is constrained to form a bed within a suitable container which might, for example, be a columnar vessel or, as another example, a cloth, metal screen or other porous bag or the like. The latter type container — a porous bag or the like — is generally used for static applications whereas the columnar vessel type container for the granular bed is generally used for applications where the fluid is flowed through the bed. In the case of the latter, the flow can be upwardly through the column, referred to as using the granular bed in an upstream mode, or alternatively, the flow can be downwardly through the column which is referred to as use in a downstream mode.

But whatever the precise form or mode of use, adsorbents in the form of loose granules have two serious disadvantages. The first disadvantage is that the loose granules, because they are movable with respect to each other, come into repeated forceful contact due to fluid flow currents and turbulence, vibration and other causes, thereby resulting in a fracturing and erosion of the granules to produce fines of the adsorbent material. As the proportion of fines increases at various points in the bed of granules, they clog the passages between the granules thereby causing increased turbulence and increased local points of pressure, and eventually the formation of channels through the bed of granules. This substantially reduces the effective amount of surface area to which the fluid being treated is exposed. Further, particularly where the bed is used in the upstream mode, the fines in the upper layers of the bed can become fluidized at points where the fluid being treated has acquired a higher than normal velocity, as at the head of a channel. As more and more fines are formed, many of them find their way out the top of the bed and are carried in the fluid stream, causing loss of adsorbent from the bed and contamination of the fluid, from which they must be eliminated by adding steps to the process, such as cycloning or screening, which costs money and reduces the overall efficiency of the process sequence. For this reason the upstream mode though otherwise generally more effective, is seldom used in place of the downstream mode.

Where the adsorbent granules are contained in a porous cloth or the like bag or other container, the fines gradually clog the passages near and through the bag or other container, thereby interfering with the free flow of the fluid.

The second serious drawback of using the adsorbent in loose granule form is that it makes difficult, and relatively expensive, the regeneration of the adsorbent. That is, the particulate adsorbent, in the form of the granules and the fines, must be removed as a loose mass from the column or other container and then not only treated to cause the regeneration or re-activation of the adsorbent material, but also sieved or otherwise fractionated to remove the fines. This not only necessitates an additional operation, but it also entails considerable loss of the adsorbent material in the form of the fines, which cannot be re-used unless reprocessed into granules, which involves even greater expense. A third and attendant drawback to the use of adsorbents in loose granule form is that the regeneration of the adsorbent material is a messy operation at best, and particularly where charcoal is the adsorbent, also a dirty operation.

BRIEF DESCRIPTION OF THE INVENTION

In accordance with the present invention, the aforesaid problems are solved by the provision of a unitary selfsustaining porous adsorbent body wherein the adsorbent granules are bonded together, by a thermoplastic organic polymer, in fixed relationship to each other, and yet without substantially decreasing the permeability of the bonded mass of granules and without substantially diminishing the access of the fluid to the internal porosity of the individual granules. Being fixed in position with respect to its neighboring granules, each granule is prevented from banging itself against them as a result of the turbulence of the fluid passing among them or other forces. Thus the formation of fines by fracture of the granules does not occur during the adsorption cycle. Removal of the adsorbent material after it has become saturated with adsorbed material is no longer messy or dirty, since the unitary body of bonded granules can be removed as a unit and no fracturing of the particles occurs during the handling, which cannot be avoided where the adsorbent material is used in loose granular form. Reactivation, whether by heating, by solvent washing, or chemical treatment, can be carried out without disrupting the unitary body, which can then be very simply reintroduced into the column or other vessel in which it is used. For those applications where it has heretofore been the practice of constraining loose adsorbent granules in a cloth bag or like container, no such container is needed and hence, excess restriction by clogged outer layers of granules, and by the cloth itself is eliminated. Another advantage to the invention is that the unitary body can easily be molded or otherwise formed to the precise desired shape.

Other features and advantages of the invention will appear more clearly from the following detailed description thereof made, in part, with reference to the accompanying drawings in which.

Figure 1:
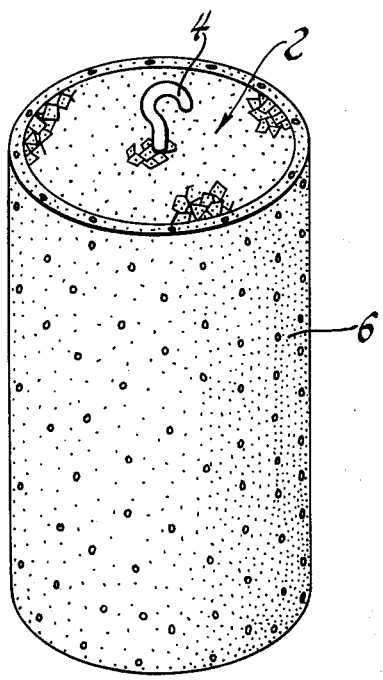
FIG. 1 is an isometric view of an adsorbent body made in accordance with the invention.

Before proceeding to a detailed description of the adsorptive bodies of the invention and the preferred method for their manufacture, it is appropriate that there be detailed description of the essential components of the adsorptive bodies.

THE GRANULAR ADSORPTIVE MATERIAL

As alluded to above, a prime example of a granular adsorptive material is granular activated carbon, or activated charcoal, as it is sometimes called. Other prime examples, also alluded to above, are granular activated silica gel and granular activated alumina commonly used as desiccants. These are preferred granular adsorptive materials for the practice of the present invention; however, for purposes of defining the invention in its broader scope it is appropriate to define and give other examples of granular adsorptive materials used for the practice of the invention.

By the term "grannular adsorptive material" or alternatively and with the same meaning, "granules of adsorptive material", is meant porous granules of a material which functions, and the primary purpose for the use of which is that it function, to reversibly separate impurities or other constituents from a fluid, and which granules in the performance of such function do not inherently undergo any significant change in size or shape or internal surface structure. The porosity, which is open porosity, is sufficiently greater that the internal surface area far exceeds the external surface area of the granules. In some instances, the separation — the adsorption — of the impurities or other constituents is known or at least thought to be a purely physical phenomenon whereas in other instances it might be known, or at least theorized, that the removal is by way of chemical bonding. Be that as it may, in all instances, the action, or reaction, is not accompanied by an inherent change in shape or size or internal surface structure of the granules, and can be reversed, by thermal or other treatment, so as to reactivate the porous granules for re-use in their intended function as aforesaid. The following are additional examples of granular materials which fall within the definition and which are useful in the practice of the present invention: the natural and synthetic zeolites commonly used as ion exchangers in the purification of water; the ion exchange resins which are commonly used to perform the same function as the zeolites, typically the Amberlites, marketed by Rohm and Hass of Philadelphia, Pennsylvania. The zeolites and ion exchange resins can be reactivated by treatment with salt water or other solutions as well known in the art. Still a further example in porous granules of the polyester resin Dacron marketed by E. I. Depont de Nemours of Wilmington, Delaware, which porous resins granules are useful as adsorbents which can be reactivated thermally or by solvent treatment, and which are otherwise within the aforesaid definition. Of course the granules must be insoluble in the fluid from which the impurities or other constituents are to be removed.

GRANULE SIZE

The granule size of the granular adsorptive material should preferably be from about 8 to 65 mesh, Tyler, and for most applications ideally from about 14 to 28 mesh. A variated or irregular granular shape is desirable and a variated granular size, or in other words an aggregate of granular sizes, within the range is desirable—this as distinguished from all the granules having the same size within the range. The granule size range bears a relationship to the desired particle size range for the particulate thermoplastic polymer used for bonding the granules together, as will hereinafter be described.

THE POLYMERIC BONDING MATERIAL

For the practice of the invention the bonding material for bonding together the adsorptive granules must be a particulate thermoplastic organic polymer having a softening temperature below that of the adsorptive granules and, of course, also below the disassociation temperature of the adsorptive granules. Still further, the polymeric material must, in the case where the unitary adsorptive body is to be thermally re-activated, have a softening temperature above that required for thermal re-activation. Of course, where the re-activation of the adsorptive granules is to be by the way of solvent or chemical treatment, the polymeric bonding material must be such as to undergo no substantial degradation by way of such solvent or chemical treatment.

The preferred polymers for use as the bonding particles in the practice of the invention are the polyamides, commonly known by nylon. Also desirable are the thermoplastic polycarbonate polymers such as that sold by DuPont under the trademark "Delrin". Further examples of thermoplastic organic polymers useful as the particulate bonding material are the polyvinyls such as polyvinyl chloride and polyvinyl acetate, the acrylics such as polymethylmethacrylate, polyethylene, polypropylene, the polyimides, and polystyrene. It will be understood, of course, that the ultimate choice of the particulate thermoplastic bonding material within the wide choice available should be such as to fall within the aforesaid parameters as regards, for example, softening temperature as compared to that of the granular adsorptive material.

PARTICLE SIZE OF THERMOPLASTIC BONDING MATERIAL

The particle size of the particulate thermoplastic polymer used as the bonding material should be between about 200 mesh and 600 mesh, Tyler. Further, it is preferred that the particle size of the bonding material be variated within this range—this as distinguished from being of one given particle size within this range.

This desired particle size for the thermosplastic bonding material bears relationship to the preferred granule size for the adsorptive material. That is, it is cardinal to the invention that the particle size of the thermoplastic bonding material be substantially less than that of the granules of the adsorptive material. In general, therefore, the lesser the size of the granules of the adsorptive material within the size range specified, the lesser should be the size of the bonding particles, within the range specified.

RATIO OF BONDING MATERIAL TO GRANULES OF ADSORPTIVE MATERIAL

For all embodiments of the invention it is preferred that the ratio between the amounts of adsorbent granules and the particulate bonding material fall within the range of from about 60 to 95 parts by volume of the granules to from about 5 to 40 parts by volume of the particulate polymer. The term "by volume" here refers not to the actual volume occupied by the particles or the granules, as the case may be, excluding the interstices between the particles or granules, but rather the volume occupied by the particles or granules, as the case may be, when poured into a container, and hence, including the volume of the interstices between the granules or particles. (The preferred volume ratio expressed is with reference to the volumes of the granules and of the particles before they are mixed. Once mixed the particles for the most part fit into the interstices between the granules and hence, the volume of the mixture is less than the combined volumes of the two separate masses prior to mixing.) In general, the greater the difference in density between the relatively light, large porous granules of adsorbent material, the lesser should be the ratio between the amounts of them used in forming the mix, on a volume basis. As will be further mentioned hereinafter, the preferred volume ratio for any given combination of adsorbent granules and particulate bonding material should be such that for each granule of adsorbent material there be from about 5 to 50 particles of the bonding material. Particularly for the preferred embodiments wherein the granular adsorptive material is activated carbon, activated silica gel or activated alumina, the most preferred range is from about 70 to 90 parts by volume of the granules and 10 to 30 parts by volume of the bonding particles.

METHOD OF MANUFACTURE

Masses of the granular adsorbent material and of the particulate thermoplastic polymeric bonding material are measured in accordance with the aforesaid, and these masses are then thoroughly mixed together, as by tumbling, to obtain a uniform mixture of the granules and the particulate bonding material. Because of the significant difference between size of the granules and the size of the particles, and also because of the difference in density between them, it is difficult to mix them dry to obtain and retain a uniform mixture since the granules and particles tend to separate or segregate, particularly during subsequent handling operations. Therefore, the mixing is preferably accomplished after addition of about 3 to 15 percent by weight water to the mixture. Such moistening with water can be accomplished by spraying the mixture during the tumbling or by subjecting the mixture to water vapor, as by steaming the mixture above boiling water in a vented container. After the water is added the tumbling is continued until the particles of bonding material are uniformly dispersed among the granules of adsorptive material. The presence of the water in the mix tends to cause the particles of bonding material to cling to the granules.

If the body to be formed is small (for example, if its cross-section has a minimum dimension of about one inch) the mixture so prepared is then placed in a suitable mold (preferably a split mold) of the shape and size desired for the unitary porous body. Suitable molds are Teflon or Teflon coated metal, or metal coated with any of the variety of parting compounds such as graphite or a heat resistent grease or oil—this to facilitate subsequent removal of the unitary body from the mold. In filling the mold with the mixture, it is generally preferable that there be no agitation or vibration of the mixture and that the mixture not otherwise be compressed or compacted so that the resulting body has optimum permeability commensurate with good bond strength. However, in some cases it may be desired to have a greater volume of adsorptive material per unit volume in which case vibration, tamping or the like can be used—though this does reduce the permeability to some extent. After the molds are filled, the molds with their content are heated, as in an oven, to the softening temperature or sintering temperature of the particulate bonding material. It is important that the heating not be to the melting temperature of the bonding material nor to a temperature significantly in excess of the softening or sintering temperature since the objective in the heating operation is to cause bonding of the contiguous adsorbent granules by way of the thermoplastic particles therebetween, but without excessive wetting of the granules by the bonding material with resultant excessive areas of bonded contact between the particles and the granules. When the heat treatment has been sufficient, the mass feels soft to a probe. The temperature is then lowered until the mass becomes rigid whereupon the mold can be disassembled and the unitary adsorbent body is removed for use. If, on the other hand, the least dimension of the body to be formed is substantially larger than about one inch, the low thermal conductivity of the mixture can create the need for excessively long heating periods, during which the outer portions of the body can become overheated while the inner portions can remain poorly bonded. For large bodies, therefore, it is preferred to preheat the mixture, as in trays or on a conveyor belt, to the bonding temperature, i.e. the softening temperature of the particulate bonding material, and then to introduce the preheated mass into the mold. When this is done, it is found advantageous for the mold to be cold, or at least heated only to a temperature lower than that of the preheated mixture, so that the rapid cooling of those particles of bonding material that end up adjacent to the mold walls tend not to adhere to the latter, thus facilitating later removal of the body from the mold. The softened mixture can, if desired, be tamped into the mold so as to increase the amount per unit volume of the adsorptive granules in the finished body, though this at the expense of the greater permeability attained where no tamping is used.

STRUCTURE OF THE UNITARY BODY

The unitary adsorbent bodies made in accordance with the invention are highly porous, both because of the porosity of the adsorbent granules and because of the communicating interstices between contiguous bonded adsorbent granules. On microscopic inspection of sectioned samples of the adsorbent bodies made in accordance with the preferred embodiments of the invention it is found that on the average each adsorbent granule has bonded thereto from about 5 to 50 of the thermoplastic particles, and of these bonded thermoplastic particles, from about 3 to 12 are bonded either directly, or indirectly through another particle, to a contiguous adsorbent granule, thereby forming small cross-sectional bridges between adjacent granules bonding them together, while at the same time providing interstices between the granules forming a network of intercommunicating passages. Because only a minor portion of the aggregate surface area of each granule is in bonded contact with the bonding particles, there is free and easy access of the fluid to the internal porosity of the granules. The result is a strong unitary adsorbent body with the granules of an adsorptive material therein in fixed relationship to each other, and yet with only an insignificant reduction in the fluid permeability of the body—a reduction substantially less than that which results after only a relatively short period of use of a loose body of granules by reason of the fines which are produced in such a loose body because of degradation of the granules from abrading contact therebetween.

FURTHER DETAILS WITH RESPECT TO PARTICULAR EMBODIMENTS

In a typical application, a unitary porous body of bonded activated carbon granules is made, which can be introduced into a columnar vessel for water purification. When saturated with material absorbed from the water, the unitary body is hoisted out, regenerated or reactivated, and then reintroduced into the column for another cycle for use. Such a body of bonded carbon granules can be used in the upstream mode just as easily as in the downstream mode, thus taking advantage of the inherently better flow characteristics of the former mode, without loss of the adsorbent material by fluidization and without the disadvantage of channeling. Where such a body is used in a columnar container there must, of course, be assurance against leakage of the fluid being treated between the body and the side walls of the vessel. It is possible but difficult and expensive to form the body to such close tolerances as to preclude any such leakage. Hence, in preferred embodiments of the invention, as it relates to end uses of this type, means are provided to seal against such leakage. There are three modifications of such preferred embodiment, one particularly for use with liquid feed and the others for use with either liquid or gaseous feeds.

In the latter, the porous body of bonded adsorbent granules is made substantially smaller in cross section than the vessel's interior and a double-wall cylindrical sleeve, i.e. a hollow annulus, of rubber or other elastomer, for example stretchable polyethylene, is placed around the body before it is lowered into the vessel. When the two are in place, the hollow annulus of rubber or other stretchable material is filled with air or liquid so that it expands radially and thereby fills and seals the space between the body and the vessel walls. The pressure inside the bag is kept at least slightly higher than that of the fluid passing through the column. This can be accomplished, for example, by the provision of a riser tube connected to the sleeve and used both for filling the sleeve with water and for keeping an excess hydraulic head on the fill. The body can sit on a screen, and a hook or other means for lifting it in an out can be integrally bonded into the body during its manufacture.

Another means used to form a good seal between the periphery of the bonded body and the walls of the vessel is simpler and cheaper, but can only be used with liquid feeds. In it, the porous body is surrounded on its peripheral surfaces with a fibrous, cellular or the like material which swells when wetted. This material is preferably bonded to the body during its manufacture. The dry body, so covered, is so dimensioned that it slides easily into the column. When in place, the column is flooded with the liquid to be treated, and a pause in the feeding is allowed to permit the covering, typically of sponge or of matted or woven fibers, to swell, thus tightly sealing the space between porous body and vessel wall. Feeding is then commenced. When the body is saturated with adsorbed matter, the column is drained and allowed to dry whereupon the fibrous or sponge-like material shrinks, reducing its thickness and permitting the body to be easily withdrawn. Suitable swellable fibrous materials are the papers used in liquid chromatography, blotting paper commonly sold for desk use, and many others. If, however, the body is to be regenerated or reactivated at an elevated temperature between use-cycles, a preferred material is common asbestos paper or cloth. Examples of sponge-like materials are the polyurethane, cellulose and the like foams or sponges well known in the trade for household and industrial uses.

Still a third way to ensure a good seal between the bonded body and the walls of the vessel is to surround the body on its lateral surface or surfaces with an elastic closed-cell foamed material. Such a material, provided always it have the requisite resistance to thermal or chemical degradation during use and during reactivation, can be bonded onto the body with a suitable adhesive, or can be integrally bonded to it during the mold-filling and heat treating operation. Prior to use, the so covered body can be readily introduced by sliding it into the vessel, and compressible nature of the foamed material giving it scant resistance to this operation. Such easily compressed foam materials are preferably low density polyurethane foams having closedcell structures. Such seals can be used for gases or liquids.

Figure 2:
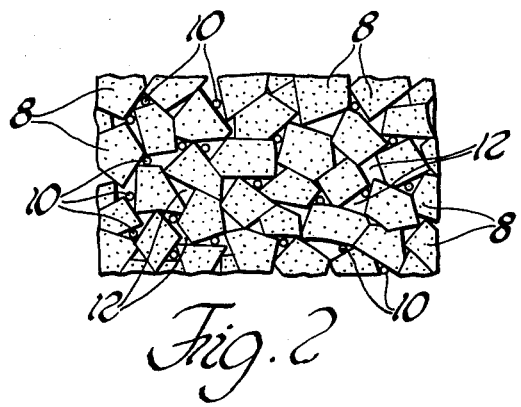
FIG. 2 is a fragmentary section view, in much enlarged scale, of the adsorbent body shown in FIG. 1.

Referring now to the drawings, in FIG. 1 there is shown an embodiment of the invention for use in a columnar vessel for water purification, as aforesaid. Such embodiment comprises a cylindrical unitary porous adsorbent body 2 having a lifting hook 4 bonded into its upper surface and a layer of rubber-like foam 6, such as polyurethane foam, surrounding and bonded to its cylindrical surface. In accordance with the invention, and as can best be seen in FIG. 2, the body 2 comprises an array of granules of adsorbent material 8 (which in this embodiment are activated carbon), and particles of a thermoplastic polymer 10 bonded to the granules. Some of the particles bridge between contiguous granules thereby bonding them together at discrete regions so as to provide the selfsustaining porous body. The granules with the thermoplastic particles bonded thereto define interstices 12 which open into each other between the bonded regions thereby providing the porosity for admission of fluid to the surface of the granules in the interior of the body.

Figure 3:
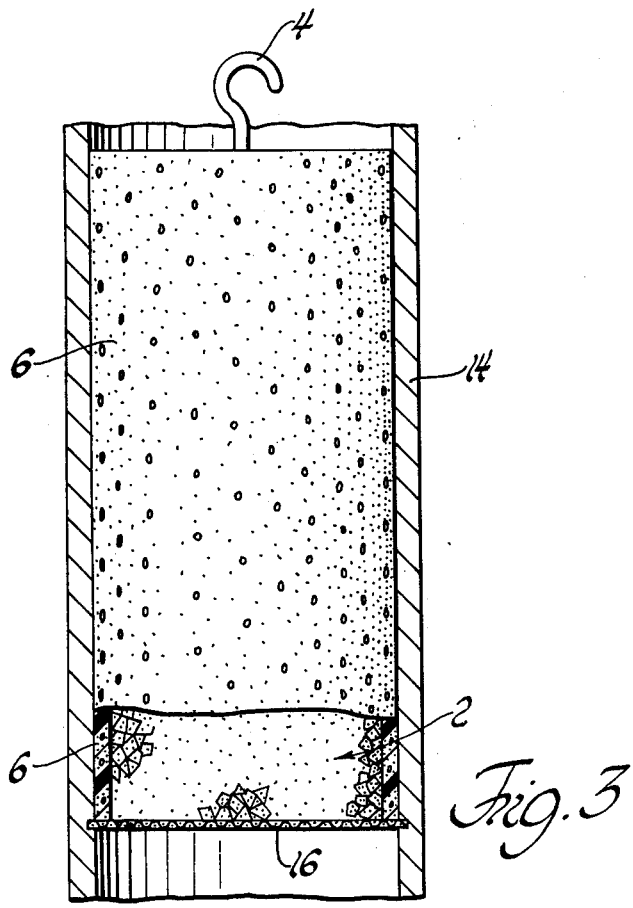
FIG. 3 is a sectional view, with parts broken away, of a columnar vessel containing the adsorptive body shown in FIG. 1.

FIG. 3 shows a columnar vessel 14, which can be of any suitable material such as metal or glass, having a screen 16 secured transversely therein, the screen supporting the adsorbent body shown in FIG. 1. After the adsorbent body is placed in the column, as by means of the lifting hook 4, water is admitted to the column whereupon the polyurethane foam layer creates a seal between the inner walls of the columnar vessel and the adsorbent body 2 to which the foam is bonded.

Figure 4:
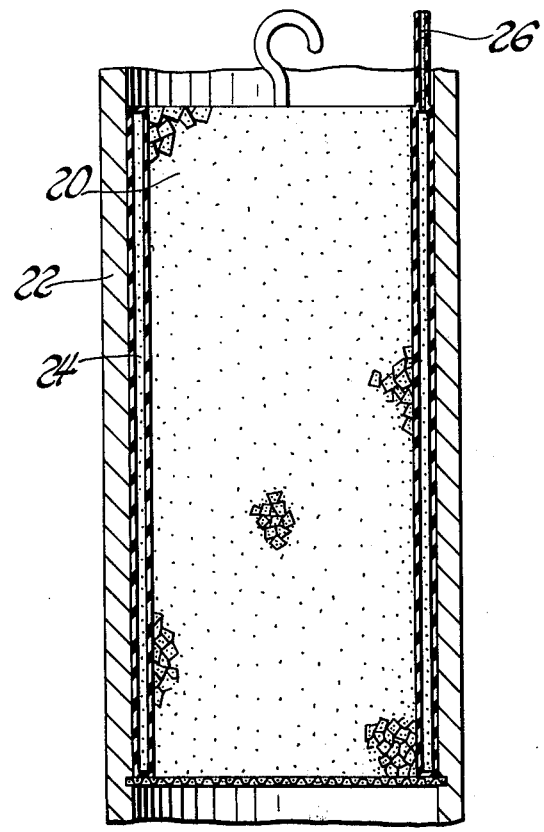
FIG. 4 is a view similar to that of FIG. 3 but showing another embodiment of the invention.

The arrangement shown in FIG. 4 is the same as that shown in FIG. 3 except that in FIG. 4 the seal between the adsorbent body 20 and the columnar vessel 22 is provided by a hollow rubber sleeve 24 which surrounds and can be, though it need not be, bonded to the adsorbent body. An upstanding tube 26 is connected to and communicates with the interior of the sleeve 24 so that fluid can be admitted into the sleeve thereby to expand the same into sealed contact with the columnar vessel.

ADDITIONAL FEATURES AND PARTICULARS WITH RESPECT TO THE INVENTION

As has been indicated previously, for most end uses of the adsorbent bodies of the present invention, the preferred granular adsorbent materials are activated carbon, activated silica gel and activated alumina. These adsorbents can be reactivated by heating in a stream of moving air which has been heated to a temperature of from about 110° C to 130° C, and sometimes as high as 200° C depending upon the nature of the substance which has been adsorbed. The ion exchange resins are also especially desirable as the adsorptive granules for the practice of the invention. Particularly where the adsorbent used is activated carbon, activated silica gel, activated alumina or an ion exchange resin, the most preferred particulate thermoplastic bonding material is nylon powder which has a softening temperature of from about 210° C to 235° C. Examples of such nylon powders are those currently marketed by E.I. Dupont de Nemours of Wilmington, Delaware under the designations "Nylon 6" and "Nylon 11". When such nylon powder is used as the particulate thermoplastic polymer in combination with granules of activated carbon, silica gel or alumina, a ratio of about 5 parts by weight of the adsorbent granules and about 1 part by weight of the particulate binder is excellent and results in a sintered body of good strength with all of the adsorbent granules bonded in fixed position, and yet with less than 2 percent of the surface area of the granules being covered by the particles bonded thereto. The sintering of the mixture can be accomplished by heating to a temperature of about 250° C for from about 5 to 45 minutes, depending upon the size of the body being formed.

Where the range of sizes of the granules is toward the lower end of the range (near 60 mesh), the quantity of nylon powder required to form a strong body is greater. Conversely, when the granules are for the most part large (near 8 mesh), as little as 5–10% by volume of nylon (measured as bulk density) is needed. Some adsorbent substances are more easily bonded than others; for example, Amberlite resins require about half as much nylon powder as does silica gel, and some prepelletized activated carbons, such as a chopped ⅛ inch diameter carbon marketed by Union Carbide Corporation of Cleveland, Ohio, require about one third as much nylon as activated natural coconut charcoal granules.

When it is desired to bond auxiliary components such as lifting hooks, top or bottom screens, tubes or the like integrally to the body during the sintering thereof, such components can advantageously also be of nylon.

There has been shown and described three means for providing a seal between the unitary adsorbent body and a vessel in which it is positioned. As still another alternative to these means for providing a seal, the adsorbent body can be sintered in the vessel in which it is to be used whereby the vessel becomes bonded to and integral with the body.

It should be pointed out that even though in the adsorbent bodies of the present invention some portions of the external surfaces of the adsorbent granules are covered by the thermoplastic particles bonded thereto, such does not significantly reduce the fluid permeability or the amount of adsorbent surface area available to the fluid being treated. In this connection, and as has been indicated above, the organic polymer powder used as the bonding material should be a thermoplastic polymer and in forming and bonding the body to unitary structure the temperature used should preferably be only slightly above the softening temperature of the powdered polymer, rather than up to the melting temperature. The assures good bonding and yet with only a very small amount of the external area of the granules being covered by the polymer. Thermosetting resins are undesirable in that in the course of bonding and curing to a hardened condition there results considerable coverage of the adsorbent granules by the resin with commensurate reduction in the desired properties for the finished adsorptive bodies.

Adsorptive bodies made in accordance with the invention are highly advantageous as compared with loose granular adsorptive material for the reasons previously mentioned. One significant advantage, for example, is that the bodies made in accordance with the invention retain their permeability for a much longer period. The following will illustrate. Two cylindrical glass columns were set up, each 24 inches long and each having an internal diameter of ⅞ inch, the inner surface of each column consisting of a thin layer of compressible, closed-cell resin foam. One of the columns was filled with loose Amberlite ion exchange resin granules. The other column was filled with a 24 inches long ⅞ inch diameter body made in accordance with the present invention and containing 75% by volume of Amberlite resin granules (identical to those used for filling the other column) and 25% by volume nylon. Impure water from a common source was then flowed through the two columns at the same flow rate. The column containing the loose granules had an initial permeability of 0.30 Darcies, but after 440 minutes had a permeability of only 0.15 Darcies. The other column, that containing the body made in accordance with the present invention, had an initial permeability of 0.94 Darcies and after 440 minutes retained this same permeability. It is significant to further note that the body made in accordance with the invention container about 0.45 grams per milliliter of the adsorptive Amberlite resin wehreas with the loose material in the other column the density of the Amberlite was only about 0.31 grams per milliliter. Hence, even though the body made in accordance with the present invention contained a greater amount per unit volume of the adsorptive material, and hence greater adsorptive capacity, its initial permeability was greater than that of the loose material and it retained the high permeability for an extended period as distinguished from the loose material wherein the permeability diminished at a relatively rapid rate.

It will be understood that while the invention has been described specifically with reference to various particular embodiments thereof, various changes and modifications may be made within the full and intended scope of the claims which follow.

The embodiments of the present invention in which an exclusive properly or privilege is claimed are defined as follows:

1. A porous adsorbent body comprising an array of granules of adsorbent material and particles of nylon having a size from about 200 to 600 mesh bonded to said granules with at least some of said particles bridging between contiguous granules and bonding them together at discrete regions to form a self-sustaining body, said granules having a size of from about 8 to 60 mesh and defining interstices which open into each other between said regions for admission of fluid to the surface of the granules in the interior of said body, the ratio between the amounts of the adsorbent granules and the particulate nylon being within the range of from about 60 to 95 parts by volume of the granules to from 5 to 40 parts by volume of the particulate nylon.

2. A porous adsorbent body as set forth in claim 1 wherein there are from about 70 to 90 parts by volume of the granules and about 10 to 30 parts by volume of the particles of nylon.

3. A porous adsorbent body as set forth in claim 1 wherein the adsorbent material is selected from the group consisting of activated carbon, activated silica gel, activated alumina and the ion exchange materials (resin, mineral, inorganic).

4. A porous adsorbent body as set forth in claim 1 wherein an exterior surface of said body has secured thereto means for sealing the body in a container.

5. A porous adsorbent body as set forth in claim 4 wherein said means is a layer of porous swellable material.

6. A porous adsorbent body as set forth in claim 4 wherein said means is a hollow sleeve of stretchable material having an inlet for the admission of fluid under pressure to the interior of the sleeve thereby to cause expansion thereof.

7. A porous adsorbent body as set forth in claim 4 wherein said means is a layer of compressible closed-cell resin foam.

* * * * *